United States Patent [19]

Lycan

[11] 4,346,918

[45] Aug. 31, 1982

[54] PIPE SPACER USED IN WELDING

[76] Inventor: Goodwin A. Lycan, P.O. Box 23, Stevensville, Mich. 49127

[21] Appl. No.: 250,620

[22] Filed: Apr. 3, 1981

Related U.S. Application Data

[63] Continuation-in-part of Ser. No. 36,780, May 7, 1979, abandoned.

[51] Int. Cl.³ .............................................. F16L 13/04
[52] U.S. Cl. ........................................ 285/22; 285/93; 285/286; 285/187; 285/383; 285/DIG. 16; 228/101
[58] Field of Search .................... 285/21, 22, 286, 187, 285/41, 279, 375, 287, 93, DIG. 16, 369, 383; 228/5.5, 106, 189, 154, 101, 56, 133, 245, 246, 249, 250, 253; 403/146, 138, 144, 149

[56] References Cited

U.S. PATENT DOCUMENTS

| | | | |
|---|---|---|---|
| 1,867,775 | 7/1932 | Stringer | 285/22 |
| 2,409,795 | 10/1946 | Rubezzana | 285/22 |
| 2,423,848 | 7/1947 | O'Connor | 285/187 X |
| 3,151,888 | 10/1964 | Wagner | 285/22 |
| 3,574,377 | 4/1971 | Petitt | 228/106 |

FOREIGN PATENT DOCUMENTS

| | | | |
|---|---|---|---|
| 122179 | 9/1946 | Australia | 85/8.8 |
| 1158723 | 1/1958 | France | 285/365 |
| 790781 | 2/1958 | United Kingdom | 151/38 |

Primary Examiner—Dave W. Arola
Attorney, Agent, or Firm—Oltsch, Knoblock & Hall

[57] ABSTRACT

A split ring pipe spacer used to separate a pipe from the fitting shoulder during welding. The spacer has yieldable protrusions for the purpose of maintaining proper spacing and alignment of the pipe and fitting during welding.

6 Claims, 8 Drawing Figures

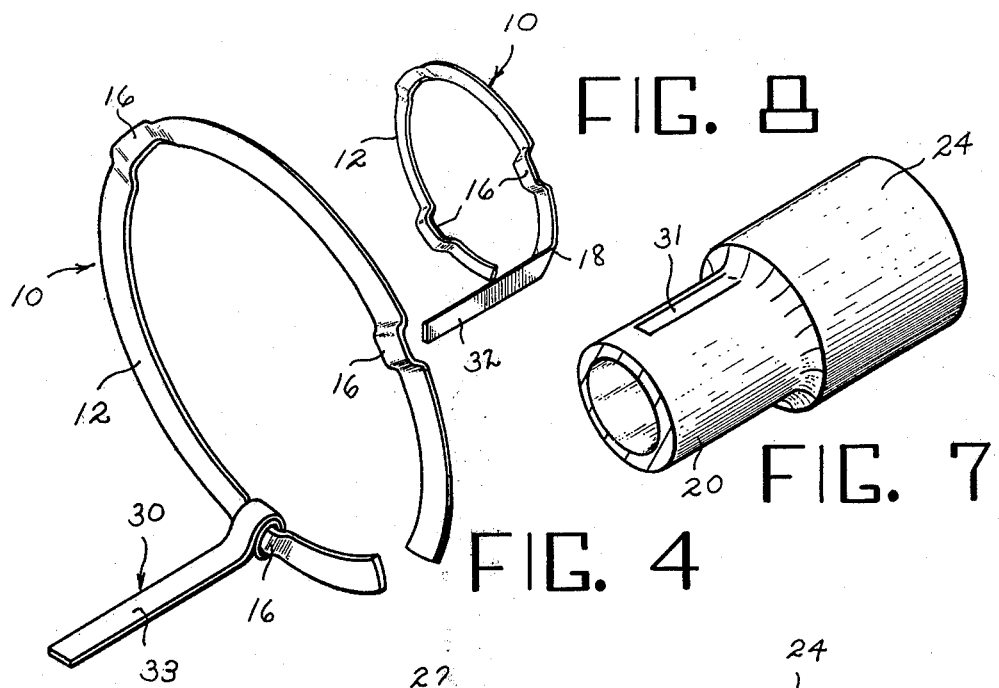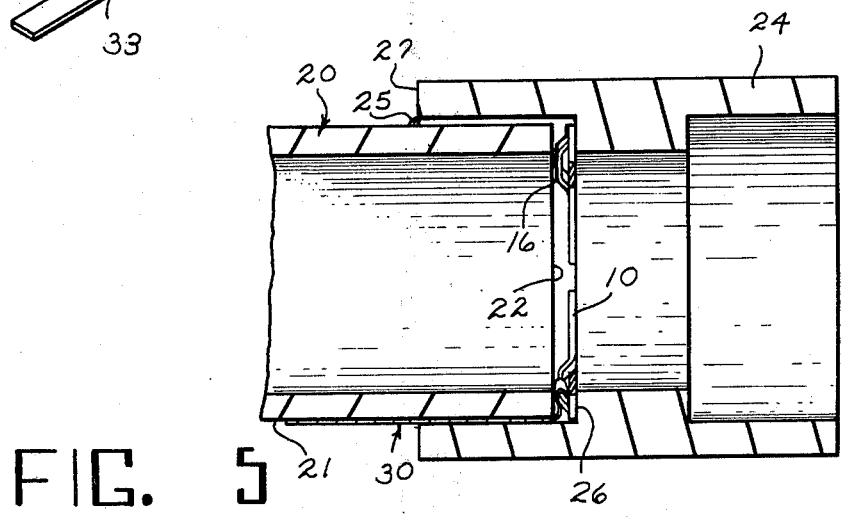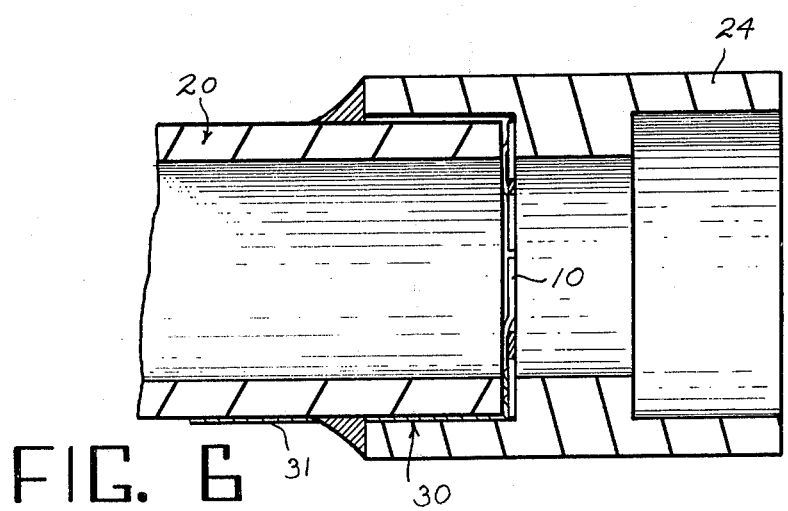

4,346,918

PIPE SPACER USED IN WELDING

CROSS REFERENCE TO RELATED APPLICATION

This is a continuation-in-part of application Ser. No. 36,780 filed May 7, 1979 and now abandoned.

SUMMARY OF THE INVENTION

This invention relates to a spacer used to separate two pieces of metal which are to be welded together.

A problem prevalent in welding is maintaining the separation of a pipe and the internal shoulder of the fitting to which the pipe is to be welded. Upon welding, the pipe expands and, unless the pipe is kept from contacting the fitting shoulder, the expansion can cause the fitting or weld to crack. In this invention a flexible ring spacer is positioned between the end of the pipe and the shoulder of the fitting. The spacer is split at one point along its body with the spacer ends so formed being separated from each other. Located along the length of the spacer are one or more protrusions. These protrusions are abutted by the surfaces of the pipe and fitting shoulder to maintain a generally axial alignment between the pipe and the fitting. During welding and heating of the pipe, the protrusions of the spacer are flexibly compressed between the expanding pipe and the fitting while maintaining a spaced relationship between the pipe and fitting shoulder.

Accordingly, it is a purpose of this invention to provide a means to separate a pipe end and fitting shoulder during welding.

Another purpose of this invention is to provide a spacer that will maintain the proper alignment of a pipe within a fitting during welding.

Another purpose of this invention is to provide an effective means of preventing weld cracking between a pipe and fitting during welding.

Still another purpose of this invention is to provide a spacer for use between a pipe and fitting during welding that is easily used and manufactured.

Still another purpose of this invention is to provide a spacer for joined welded pipe having a visible locator for ascertaining the presence of the spacer.

Still another purpose of this invention is to provide a spacer which accurately defines the gap between a pipe and shoulder, allowing an engineer to accurately determine the length of pipe needed in a run.

Other purposes of this invention will become apparent upon a reading of the following description.

BRIEF DESCRIPTION OF THE DRAWINGS

FIG. 4 is a perspective view of another embodiment of the spacer.

FIG. 5 is a sectionalized side view of a pipe and fitting prior to welding with the spacer of FIG. 4 used.

FIG. 6 is a sectionalized view like FIG. 5 but after welding.

FIG. 7 is a perspective view of the welded pipe as seen from below.

FIG. 8 is a perspective view of another embodiment of the spacer.

DESCRIPTION OF THE PREFERRED EMBODIMENTS

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

Figure 1:
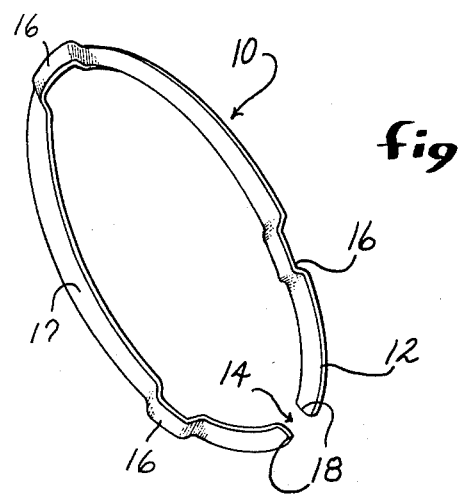
FIG. 1 is a perspective view of one embodiment of the spacer.

As shown in FIG. 1, spacer 10 has a flattened ring-shaped body 12 with a split 14 formed in it to define spaced ends 18. Formed in body 12 are protrusions 16. Spacer 10 is formed of a flexible material such as stainless steel welding wire to allow for the compressibility of protrusions 16.

Figure 2:
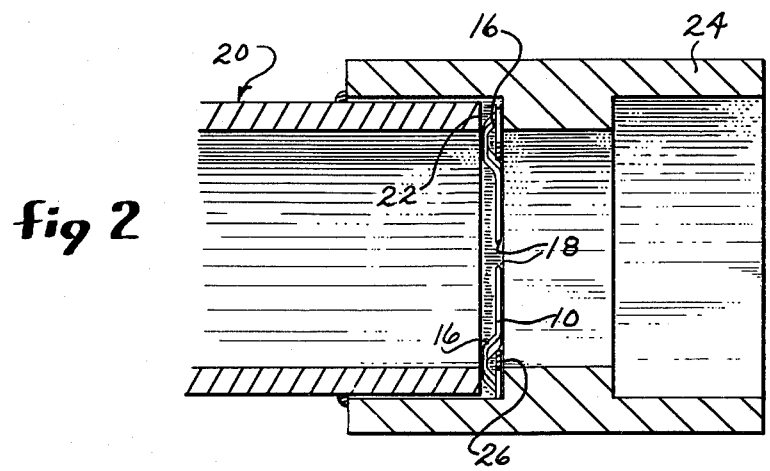
FIG. 2 is a sectionalized side view of a pipe and fitting prior to welding with the spacer of FIG. 1 inserted there-between and the pipe tacked to the fitting.

Spacer 10 is placed into fitting 24 and positioned against shoulder 26 before the insertion of pipe 20. Upon the insertion of pipe 20 into fitting 24 as seen in FIG. 2, pipe end 22 contacts spacer 10 with the spacer being lightly compressed between the pipe and fitting. Pipe 20 is tacked to fitting 24 in preparation for welding.

Protrusions 16 of the spacer serve two purposes; namely, to align pipe 20 with fitting 24 and to selectively space pipe end 22 from fitting shoulder 26 in preparation for welding the pipe and fitting together. Three equal height and generally equal angularly spaced protrusions 16 are formed in spacer body 12 to enable the spacer to assume a substantially precise transverse orientation within fitting 24.

Figure 3:
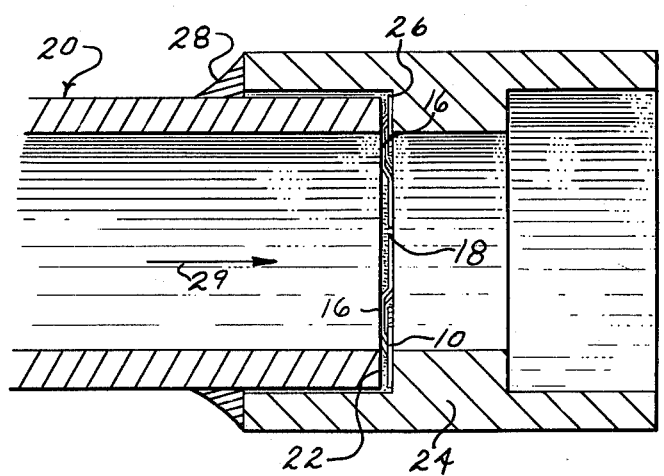
FIG. 3 is a sectionalized side view of a pipe and fitting during welding with the spacer of FIG. 1 therebetween.

FIG. 3 depicts the positions of spacer 10 and pipe 20 as weld 28 is formed between the pipe and fitting 24. During such welding, pipe 20 expands due to heat, as depicted by arrow 29. This expansion causes protrusions 16 to be partly compressed with a resulting circumferential expansion of spacer body 12 allowed by the space at slit 14 between ends 18 of the spacer. Additionally, there may be a slight diametrical expansion of spacer body 12 if there is an initial diametrical clearance of spacer 10 within fitting 24.

The height of each protrusion 16 as measured between face 17 of spacer body 12 and the top of the protrusion is designed to exceed the calculated maximum expansion of pipe 20 and fitting 24 at the spacer during welding so that the protrusions will never be compressed far enough to permit noncompressive contact between the pipe, spacer and fitting.

In FIGS. 4 and 5, spacer 10 is shown with a locater or tab 30 connected to it. Tab 30 is preferably formed of a paper or light film-like plastic, or similar type construction having an adhesive 33 applied to one side. One end of tab 30 is secured about body 12 of spacer 10, preferably at a protrusion 16, so that the tab extends generally radially from the spacer. Prior to insertion of spacer 10 within pipe 20, a removable cover material (not shown) will be applied over the adhesive backed side of the tab.

To use spacer 10 carrying tab 30, the spacer is placed into fitting 24 and positioned against shoulder 26 before the insertion of pipe 20 as previously described for the embodiment of FIGS. 1–3. Tab 30 is preferably positioned with its adhesive backed side facing the center of the fitting so as to be located against the outside surface 21 of pipe 20 when the pipe is fitted or inserted into fitting 24, as seen in FIG. 5. Prior to the insertion of pipe 20 into fitting 24, the adhesive cover applied to tape 30 is removed and tab 30 bent outwardly around the end of the fitting and held until the pipe is fully inserted into the fitting with pipe end 22 contacting spacer 10 at protrusions 16 of the spacer. Tab 30 is then released and brought to bear against the outside surface 21 of pipe 20 at its adhesive backed side so as to be attached to the pipe. The length of tab 30 with spacer 10 seated within fitting 24 is sufficient to allow the tab to extend beyond the fitting and to be visible along the length of the pipe for a distance of approximately one to two inches depending upon the pipe size. If desired, tab 30 could be return bent around the end 27 of fitting 24 and adhered to the outer surface of the fitting in preparation for welding. In this case, tab 30 would have an adhesive applied to both of its sides.

Pipe 20 is now tacked at 25 to fitting 24 in preparation for welding. When pipe 20 is fully welded to fitting 24, tab 30 will be burnt away at the location of the weld so as not to interfere with the integrity of the weld. The remaining end 31 of tab 30 remains attached to the exterior of pipe 20 or fitting 24, as the case may be, as a visible reminder that the spacer 10 was utilized within the fitting during the welding process. In this manner, the presence of the spacer can be verified by quick visual observation without the necessity of a confirming X-ray of the joint.

While tab 30 has been described in this embodiment as being of a paper, thin flexible plastic, or similar lightweight construction, it is contemplated that the tab may also be formed of the same material as the spacer ring and be simply an outturned extension 32 which extends laterally from one end 18 of spacer body 12 as seen in FIG. 8.

In each of the above embodiments described with regard to spacer 10, it is contemplated that the spacer will remain within the fitting 10 after the pipe and fitting have been welded together. There are no parts of spacer 10 which project into the passage or flow path through the connected pipe and fitting. Normally, the radial expansion of spacer 10 within the fitting prior to welding will serve to retain the spacer. But in order to certain that the spacer does not fall out of or become jarred loose from the fitting after once being inserted, such as could occur during transportation or movement of the fitting to the weld location, it may be preferable to tack-weld the spacer to the fitting. This is preferably done at the location between the internal shoulder 26 of the fitting and at or near the flat of a protrusion 16 of the spacer. By being tacked at only one location, the spacer is free to expand during compressive loading between the pipe and fitting as welding takes place.

While in the preferred embodiments spacer 10 is described as being formed of a metal material, it is to be understood that in some uses of this invention the spacer may be formed of a water or liquid soluble material which retains sufficient rigidity to perform its spacing function but yet, after welding of the pipe to the fitting or coupling and the introduction of a liquid through the pipe, will become dissolved and flushed from the system. When using liquid soluble spacers, the tab 30 illustrated in the second embodiment of this invention still may be utilized as an indicator for determining the presence of the spacer during welding.

It is to be understood that the invention is not to be limited to the details above given, but may be modified within the scope of the appended claims.

What I claim is:

1. A spacer for positioning between the end of a pipe and an internal annular shoulder of a bore of a fitting into which bore said pipe is inserted in preparation for welding the pipe to the fitting, said spacer including a ring-shaped body, said body having a yieldable offset section serving to increase the effective thickness of said spacer and having an outer diametrical dimension approximating the outer diametrical dimension of said pipe whereby said body abuts one of said pipe end and fitting shoulder at said offset section when positioned between said fitting shoulder and pipe end, said offset section being yieldable sufficiently to space said one pipe end or fitting shoulder from the remainder of said spacer to prevent unyielding abutment between the pipe and spacer upon pipe expansion during welding, the improvement comprising a split formed in said spacer body defining spaced ends of the spacer body, said spacer body lying substantially in the same plane except for said offset section, a tab part extending from said spacer body, said tab part projecting generally perpendicularly relative to said plane of the body and constituting means for extending between said fitting and pipe and beyond the fitting to indicate the presence of the spacer when positioned between said pipe end and said fitting shoulder.

2. The spacer claim 1 an adhesive means applied to said tab part for adhesion to one of said pipe and fitting at the outer surface thereof before and after said welding.

3. The spacer claim 1 wherein said tab part extends from one of said spacer body ends.

4. A spacer for positioning between the end of a pipe and an internal annular shoulder of a bore of a fitting into which bore said pipe is inserted in preparation for welding the pipe to the fitting, said spacer comprising a split ring-shaped body, said body having a non-circular cross section with opposite flat surfaces and including spaced ends, a plurality of protruding offset sections formed by said body with the body being substantially coplanar except for said offset sections, said offset sections serving to increase the effective thickness of said spacer, said body having an outer diametrical dimension approximating the outer diametrical dimension of said pipe whereby said body abuts one end of said pipe end and fitting shoulder at said offset sections when positioned between said fitting shoulder and pipe end, said offset sections being generally equal angularly spaced apart about said body and being compressively yieldable sufficiently to space said one pipe end or fitting shoulder from the remainder of said spacer to prevent unyielding abutment between the pipe and spacer upon pipe expansion during welding, and said body ends being spaced sufficiently to accommodate circumferential expansion of said body to prevent abutment of the body ends during said pipe expansion as said offset sections are yieldably compressed.

5. The spacer of claim 4 wherein there are three of said offset sections.

6. The spacer of claim 4 wherein the outer diameter exceeds the inner diametrical dimension of said pipe bore, said body being flexible to enable said body to be fitted in diametrical compression within the bore.

* * * * *